United States Patent
Shin et al.

(10) Patent No.: US 8,305,967 B2
(45) Date of Patent: Nov. 6, 2012

(54) METHOD AND SYSTEM FOR SCHEDULING SUBFRAME IN MOBILE COMMUNICATION RELAY SYSTEM

(75) Inventors: Jae Sheung Shin, Daejeon (KR); Hyun Seo Park, Daejeon (KR); Kyung Sook Kim, Daejeon (KR); Young Jick Bahg, Daejeon (KR); Yeon Seung Shin, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 301 days.

(21) Appl. No.: 12/851,150

(22) Filed: Aug. 5, 2010

(65) Prior Publication Data

US 2011/0141984 A1 Jun. 16, 2011

(30) Foreign Application Priority Data

Dec. 15, 2009 (KR) ........................ 10-2009-0124500

(51) Int. Cl.
*H04Q 7/00* (2006.01)
*H04L 12/28* (2006.01)
(52) U.S. Cl. ........................ 370/328; 370/401
(58) Field of Classification Search .................. 370/277, 370/278, 282, 312, 328, 338, 401
See application file for complete search history.

(56) References Cited

U.S. PATENT DOCUMENTS

| | | | |
|---|---|---|---|
| 2009/0163220 A1 | 6/2009 | Liu et al. | |
| 2010/0302987 A1* | 12/2010 | Sawahashi et al. | 370/312 |
| 2011/0122811 A1* | 5/2011 | Yuan et al. | 370/328 |
| 2012/0155365 A1* | 6/2012 | Hollick et al. | 370/312 |

FOREIGN PATENT DOCUMENTS

| | | |
|---|---|---|
| KR | 1020090110791 | 10/2009 |
| WO | 2008/063917 A1 | 5/2008 |

* cited by examiner

*Primary Examiner* — Hong Cho
(74) *Attorney, Agent, or Firm* — Nelson Mullins Riley & Scarborough LLP; EuiHoon Lee, Esq.

(57) ABSTRACT

Provided is a subframe scheduling method in which a relay may transmit interval information of a service to a base station, and the base station may modify a location of a subframe based on the interval information, and thereby preventing a quality deterioration occurring due to a retransmission failure. The subframe scheduling method may include: setting and transmitting, by a base station, subframe information; setting and implementing, by a relay, a service based on the subframe information; transmitting, by the relay, interval information of the service to the base station; modifying, by the base station, the subframe information based on the interval information; and transmitting, by the base station, the modified subframe information to the relay.

20 Claims, 6 Drawing Sheets

METHOD AND SYSTEM FOR SCHEDULING SUBFRAME IN MOBILE COMMUNICATION RELAY SYSTEM

CROSS-REFERENCE TO RELATED APPLICATION

This application claims the benefit of Korean Patent Application No. 10-2009-0124500, filed on Dec. 15, 2009, in the Korean Intellectual Property Office, the disclosure of which is incorporated herein by reference.

BACKGROUND

1. Field of the Invention

The present invention relates to a method and system for scheduling a subframe in a mobile communication system, and more particularly, to a method of modifying a location of a subframe and thereby preventing a quality deterioration occurring due to a retransmission failure.

2. Description of the Related Art

To provide a service even to a terminal positioned in an area where a base station may not provide a service, a mobile communication system employs a relay to relay transmission of information between the base station and the terminal.

In this instance, the relay may relay information between the base station and the terminal using the same radio resource and thus may transmit and receive information by employing only a single link at a one time.

Specifically, to reduce an effect to the terminal, the relay may transmit and receive information to and from the base station with respect to only a Multimedia Broadcast Multicast Service (MBMS) subframe that is a dedicated radio frame used to transmit data to an MBMS Single Frequency Network (MBSFN) terminal.

However, when the relay provides a bi-directional transmission service at a fixed interval, a corresponding subframe may be positioned at a retransmission timing of a packet of which a transmission failed. In this case, a retransmission may not be performed and thereby a quality may be deteriorated.

Accordingly, there is a desire for a method that may avoid a situation where a subframe may be positioned in a retransmission timing in a bi-directional transmission service, and thereby may prevent a retransmission failure.

SUMMARY

An aspect of the present invention provides a system for scheduling a subframe in which when providing a bi-directional transmission service at fixed intervals, a relay may transmit interval information of a service to a base station, and the base station may modify a location of a subframe based on the interval information, and thereby preventing a quality deterioration occurring due to a retransmission failure.

According to an aspect of the present invention, there is provided a system for scheduling a subframe, including: a base station to set and transmit subframe information; and a relay to relay transmission and reception of information between the base station and a plurality of terminals, to set and implement a service based on the subframe information, and to transmit interval information of the service to the base station. The base station may modify the subframe information based on the interval information, and may transmit the modified subframe information to the relay.

The base station may calculate a retransmission frame where a transmission of information fails and thereby the information is retransmitted, based on the interval information and the initiation time, and may modify the subframe information so as not to overlap the location of each subframe and the retransmission frame.

When the modified subframe information is received, the relay may modify the interval information based on the modified subframe information.

According to another aspect of the present invention, there is provided a method of scheduling a subframe, including: setting and transmitting, by a base station, subframe information; setting and implementing, by a relay, a service based on the subframe information; transmitting, by the relay, interval information of the service to the base station; modifying, by the base station, the subframe information based on the interval information; and transmitting, by the base station, the modified subframe information to the relay.

EFFECT

According to embodiments of the present invention, when providing a bi-directional transmission service at fixed intervals, a relay may transmit interval information of a service to a base station, and the base station may modify a location of a subframe based on the interval information, and thereby preventing a quality deterioration occurring due to a retransmission failure.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
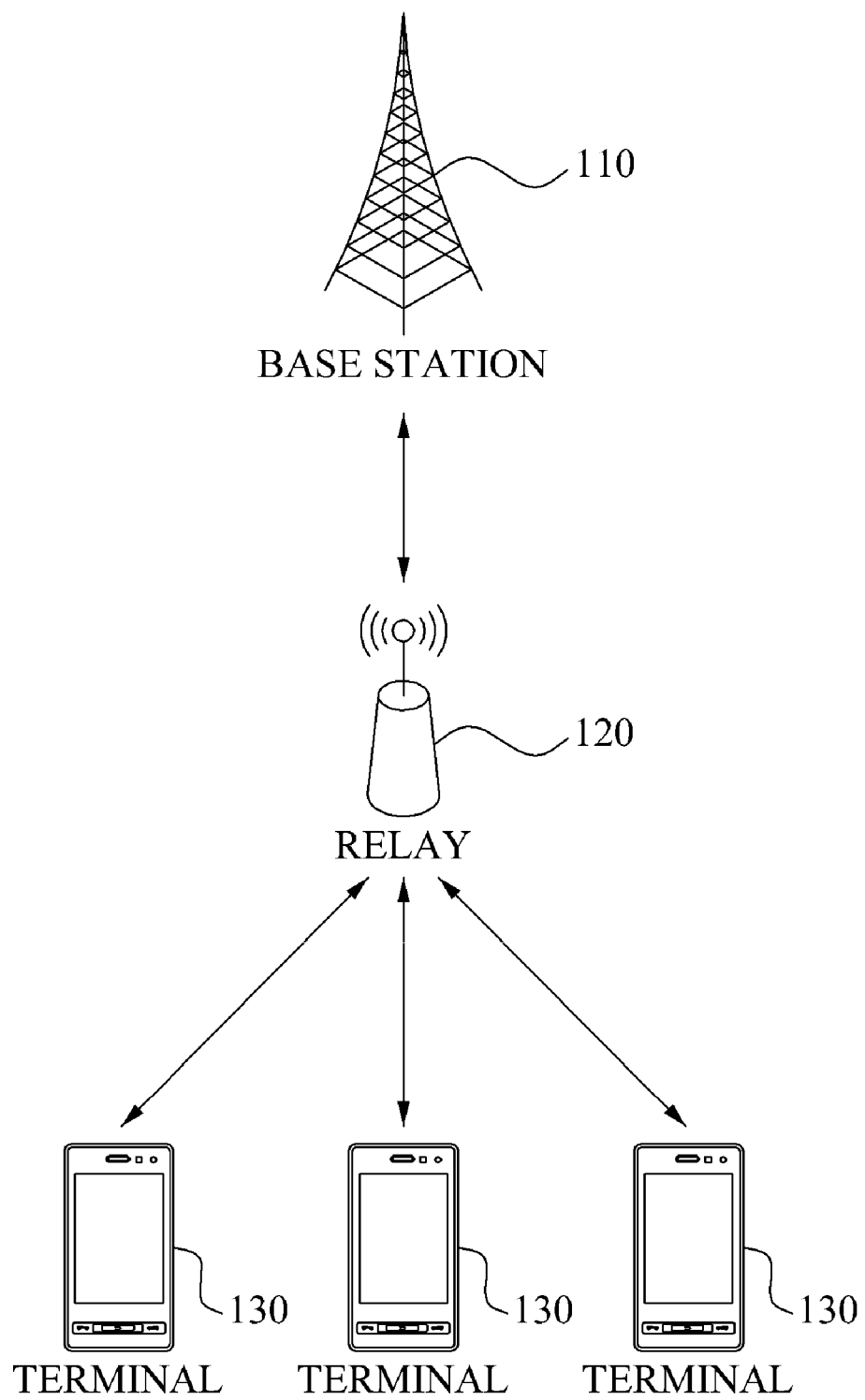
FIG. 1 is a diagram illustrating an example of a system for scheduling a subframe according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an example of a system for scheduling a subframe according to an embodiment of the present invention.

Referring to FIG. 1, the subframe scheduling system may include a base station 100, a relay 120, and a plurality of terminals 130.

The subframe scheduling system may provide a Semi-Persistent Scheduling Service (SPS) of bi-directionally transmitting data at fixed intervals so as to provide a voice and video communication service.

The base station 110 may set subframe information and transmit the set subframe information to the relay 120. The base station 110 may modify the subframe information based on interval information transmitted from the relay 120, and transmit the modified subframe information to the relay 120. In this instance, the subframe information may be associated with a number of subframes and information associated with a location of each subframe.

The base station 110 may transmit the subframe information using a scheme of broadcasting the subframe information as system information.

The relay 120 may relay transmission and reception of information between the base station 110 and the plurality of terminals 130, may set and implement a service based on the subframe information, and may transmit interval information of the service to the base station 110.

The base station 110 may calculate a retransmission frame where a transmission of information fails and thereby the information is retransmitted in a case where transmission of information between the base station and the plurality of terminals 130 fails, based on the interval information and an initiation time of the service, and may modify the subframe information so that the location of each subframe may not be overlapped with the retransmission frame, or may be minimally overlapped therewith.

The relay 120 may receive the modified subframe information transmitted from the base station 110, and may modify the interval information based on the modified subframe information.

The relay 120 may transmit, to the base station 110, the modified interval information and a time when the interval information is modified.

The relay 120 may transmit the interval information using a signal message of a Radio Resource Control (RRC) layer, or using a Media Access Control (MAC) Protocol Data Unit (PDU). The relay 120 may transmit the interval information by adding a control element to the MAC PDU.

An example of a MAC PDU used by a relay will be further described with reference to FIGS. 3 and 4.

Figure 2:
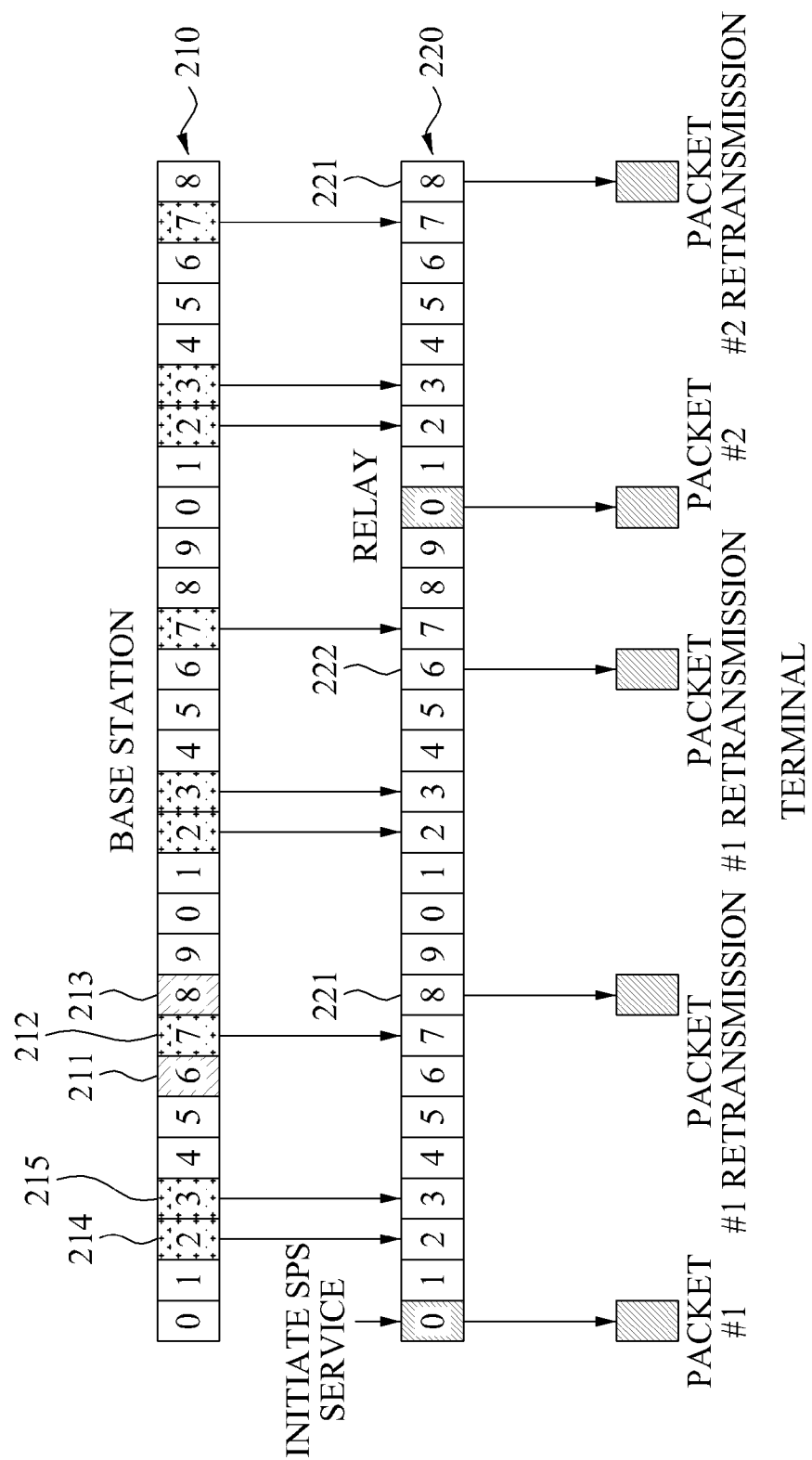
FIG. 2 is a diagram illustrating an example of a process of transmitting and receiving, by a relay, information according to an embodiment of the present invention.

FIG. 2 is a diagram illustrating an example of a process of transmitting and receiving, by a relay, information according to an embodiment of the present invention.

When initiating an SPS service, a base station may broadcast subframe information 210 where a sixth frame 211, a seventh frame 212, and an eighth frame 213 are set as subframes.

In this instance, when a transmission of an information packet fails, the relay receiving the subframe information 210 may transmit, to the base station, interval information 220 associated with intervals 221 and 222 where the information packet is retransmitted to a terminal.

The base station receiving the interval information 220 may calculate the retransmission frame where the information packet is retransmitted, based on the interval information 220, and may verify whether a retransmission frame is overlapped with a subframe.

For example, in FIG. 2, the base station may verify that a retransmission frame corresponding to the interval 221 is overlapped with the eight frame 213 set as the subframe, and that a retransmission frame corresponding the interval 222 is overlapped with the sixth frame 211 set as the subframe.

Next, the base station may modify the subframe information 210 and broadcast the modified subframe information 210 to the relay so that locations of corresponding subframes may not be overlapped with the retransmission frames.

For example, in FIG. 2, the base station may change, to subframes, the second frame 214 and the third frame 215 instead of the sixth frame 211 and the eight frame 213 overlapped with the retransmission frames, and thereby prevent the retransmission of the information packet from being interrupted by the subframes.

Figure 3:
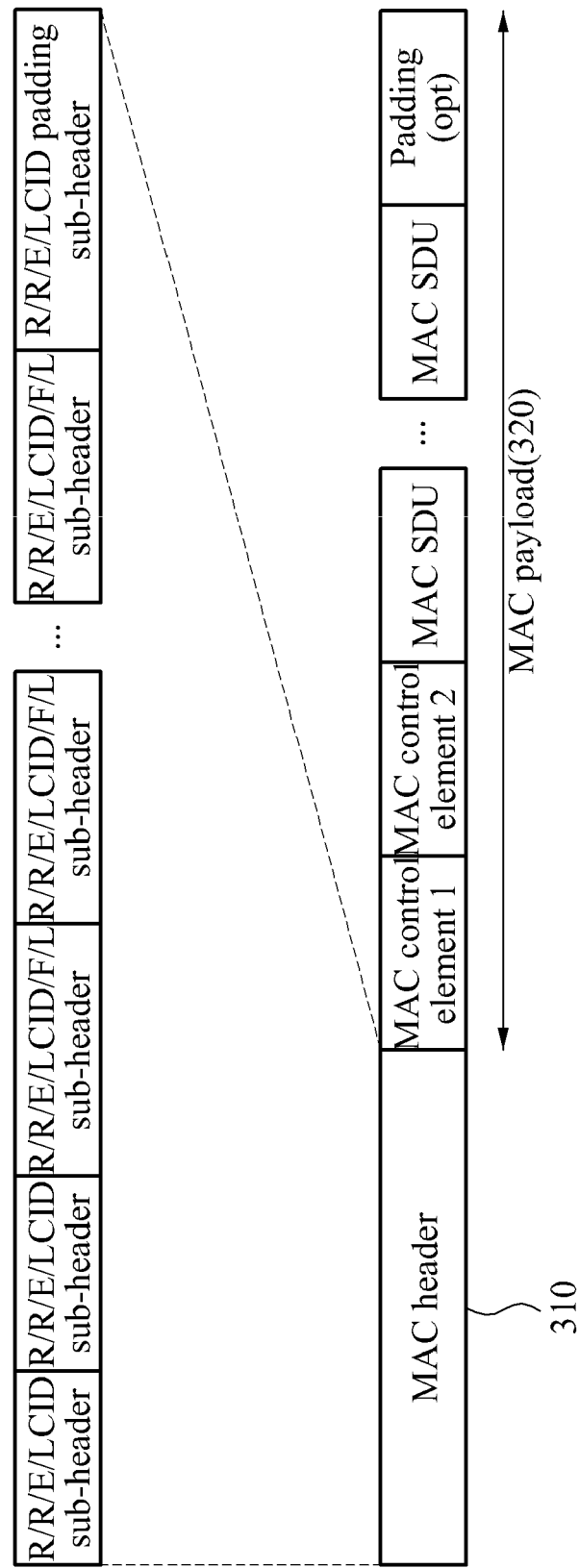
FIG. 3 is a diagram illustrating an example of a Media Access Control (MAC) Protocol Data Unit (PDU) transmitting interval information according to an embodiment of the present invention.

FIG. 3 is a diagram illustrating an example of a MAC PDU transmitting interval information according to an embodiment of the present invention.

As shown in FIG. 3, the MAC PDU may include a MAC header 310 and a MAC payload 320.

Figure 4:
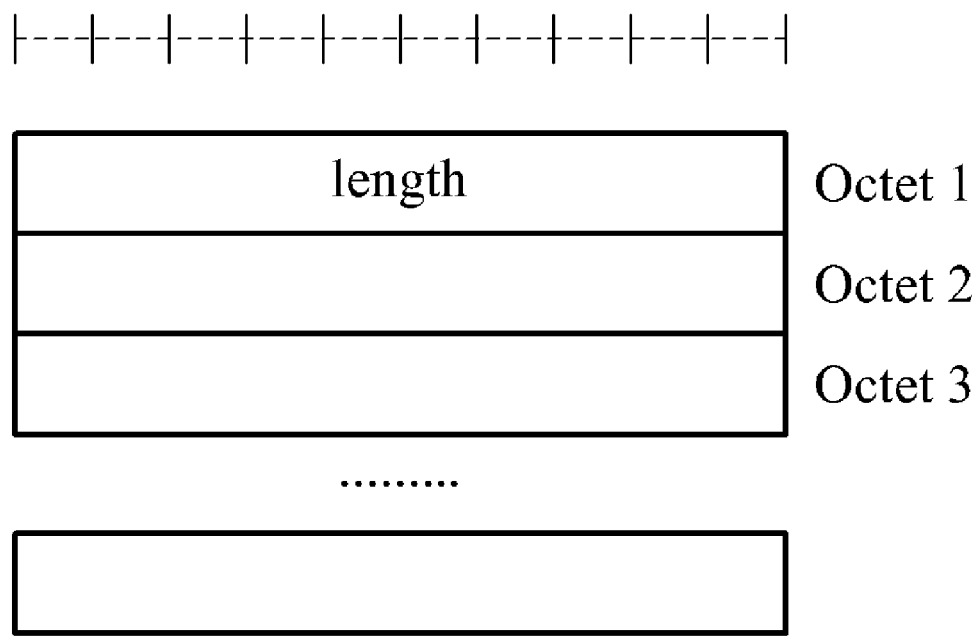
FIG. 4 is a diagram illustrating an example of a control element added to a MAC PDU according to an embodiment of the present invention.

As shown in FIG. 4, a relay may add, to the MAC PDU, a control element 400 having a variable size and thereby transmit interval information.

Figure 5:
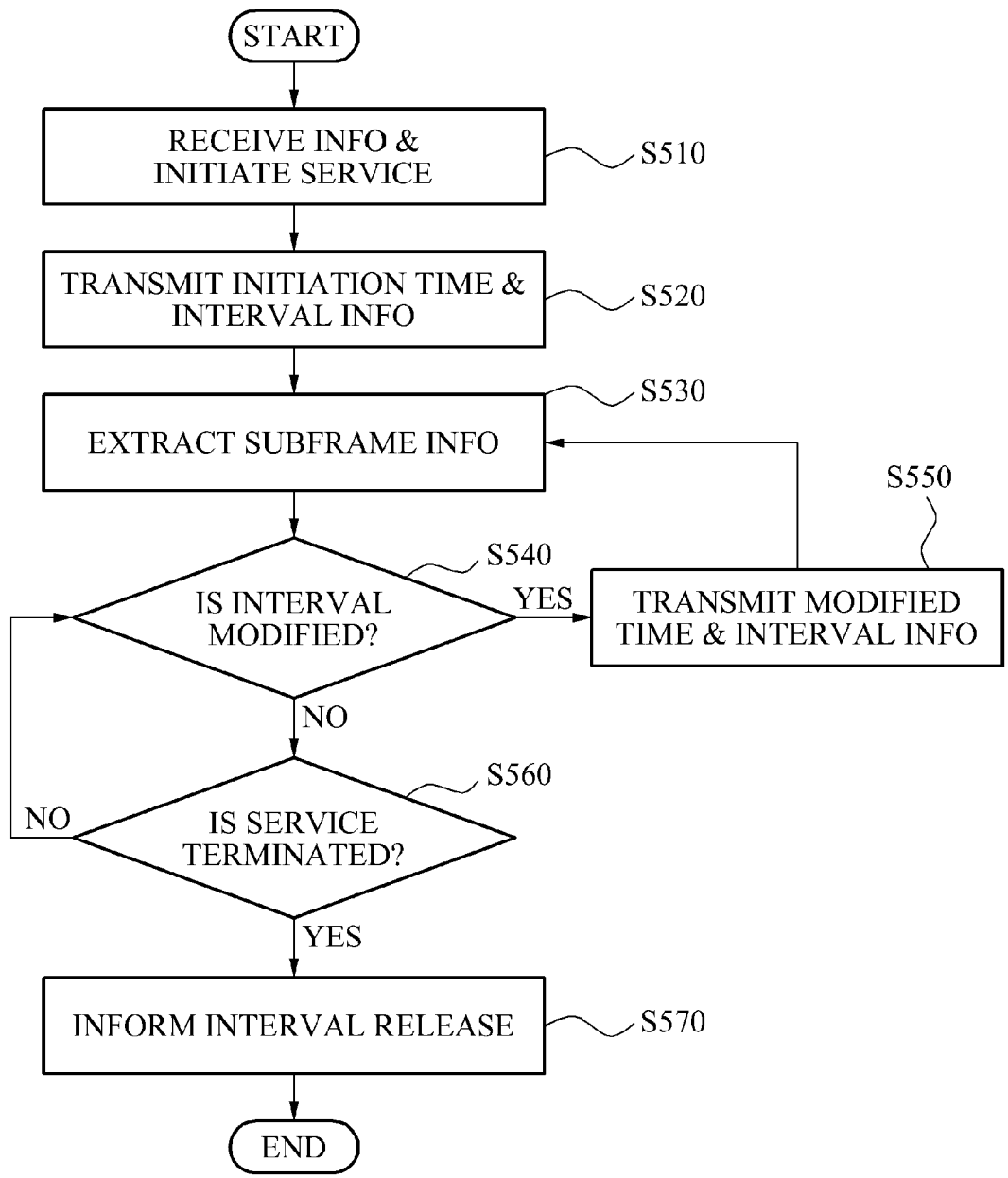
FIG. 5 is a flowchart illustrating a method of operating a relay according to an embodiment of the present invention.

FIG. 5 is a flowchart illustrating a method of operating a relay according to an embodiment of the present invention.

In operation S510, the relay may receive system information broadcast from a base station, and extract subframe information from the received system information.

In this instance, the relay may set a service based on the extracted subframe information and implement the set service. For example, the relay may set an SPS service using an RRC layer and implement the SPS service.

In operation S520, the relay may transmit, to the base station, an initiation time of the service and interval information of the service. The interval information may be associated with an information transmission of the initiated service and a retransmission interval thereof.

In operation S530, the relay may receive information transmitted from the base station according to the service, and may extract the subframe information from the information.

In this instance, the relay may verify whether the extracted subframe information is different from existing subframe information. A default value of the existing subframe information may correspond to subframe information received in operation S510.

Next, when the subframe information is modified, the relay may compare the modified subframe information with the subframe information extracted in operation S530.

In operation S540, the relay may verify whether an interval of the service is modified.

In operation S550, the relay may transmit, to the base station, the interval of the service verified to be modified, and a time when the interval of the service is modified.

In operation S560, the relay may verify whether the service executed in operation S510 is terminated.

In operation S570, the relay may inform the base station about an interval release of the service verified to be terminated in operation S560.

Figure 6:
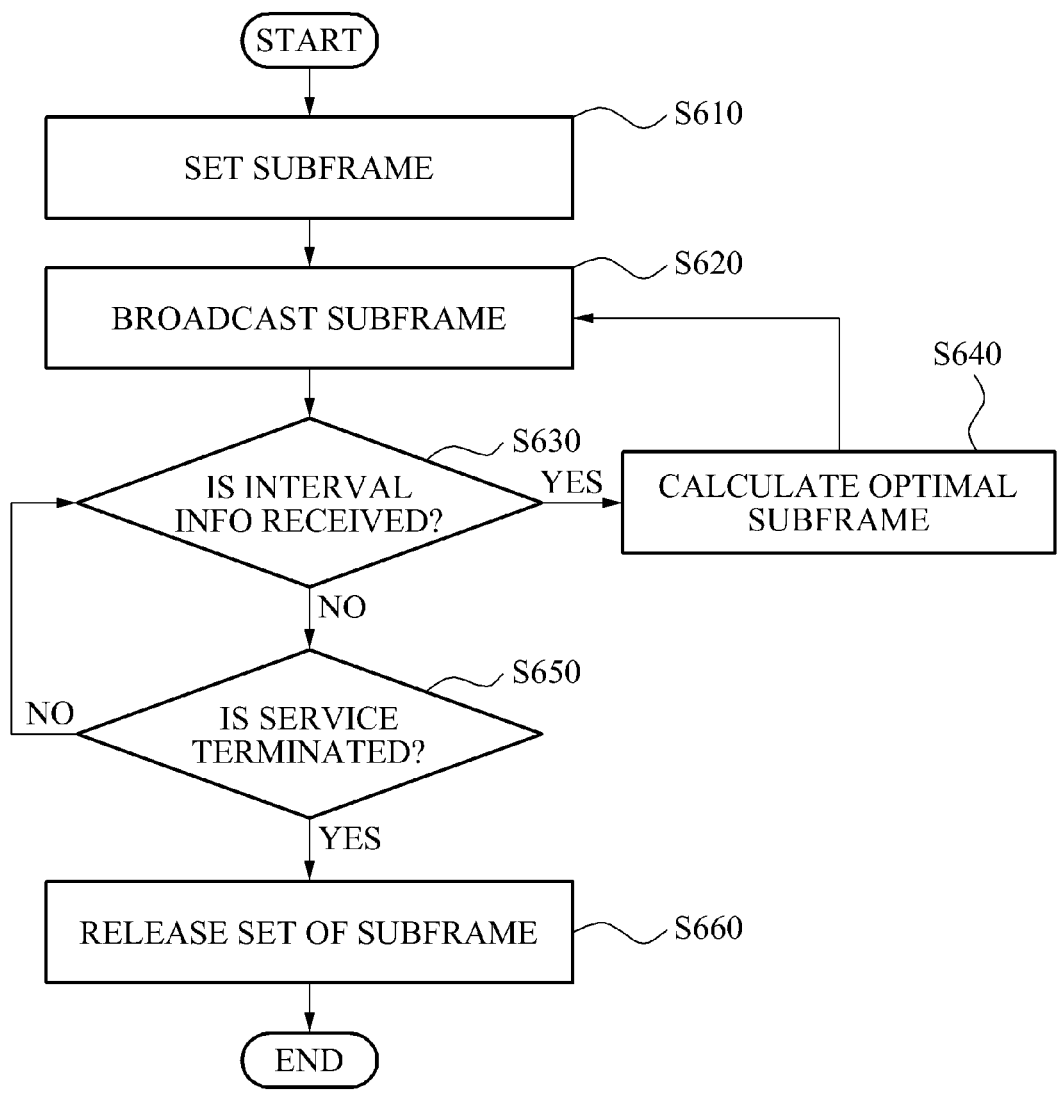
FIG. 6 is a flowchart illustrating a method of operating a base station according to an embodiment of the present invention.

FIG. 6 is a flowchart illustrating a method of operating a base station according to an embodiment of the present invention.

In operation S610, the base station may set a subframe based on predetermined setting information. The set subframe may be a subframe for transmission and reception of information between the base station and a relay.

In operation S620, the base station may broadcast the set subframe as system information.

In operation S630, the base station may verify whether an interval signal is transmitted from the relay.

In this instance, the relay may correspond to a relay receiving the system information broadcast in operation S620. The interval signal may correspond to an interval signal transmitted from the relay.

In operation S640, the base station may modify subframe information based on the received interval information, and go to operation S620 to broadcast the modified subframe information as the system information.

Specifically, the base station may calculate a retransmission frame where a transmission of information fails and thereby the information is retransmitted, based on the interval information and an initiation time of a service, and may modify the subframe information so as not to overlap the location of each subframe and the retransmission frame.

In operation S650, the base station may verify whether the service is terminated.

In operation S660, the base station may release a setting of the subframe based on an interval release of a service.

In a subframe scheduling system according to embodiments of the present invention, when providing a bi-directional transmission service at fixed intervals, a relay may transmit interval information of a service to a base station, and the base station may modify a location of a subframe based on the interval information, and thereby preventing a quality deterioration occurring due to a retransmission failure.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for scheduling a subframe, comprising:
   a base station to set and transmit subframe information; and
   a relay to relay transmission and reception of information between the base station and a plurality of terminals, to set and implement a service based on the subframe information, and to transmit interval information of the service to the base station,
   wherein the base station modifies the subframe information based on the interval information, and transmits the modified subframe information to the relay.

2. The system of claim 1, wherein the relay transmits, to the base station, the interval information and an initiation time of the service.

3. The system of claim 2, wherein the subframe information is associated with a number of subframes and information associated with a location of each subframe.

4. The system of claim 3, wherein:
   the base station calculates a retransmission frame where a transmission of information fails and thereby the information is retransmitted, based on the interval information and the initiation time, and modifies the subframe information so as not to overlap the location of each subframe and the retransmission frame.

5. The system of claim 1, wherein:
   when the modified subframe information is received, the relay modifies the interval information based on the modified subframe information.

6. The system of claim 5, wherein the relay transmits, to the base station, the modified interval information and a time when the interval information is modified.

7. The system of claim 6, wherein the base station transmits the subframe information to the relay by broadcasting the subframe information as system information.

8. The system of claim 1, wherein the relay transmits the interval information using a signal message of a Radio Resource Control (RRC) layer.

9. The system of claim 1, wherein the relay transmits the interval information using a Media Access Control (MAC) Protocol Data Unit (PDU).

10. The system of claim 9, wherein the relay transmits the interval information by adding a control element to the MAC PDU.

11. A method of scheduling a subframe, comprising:
    setting and transmitting, by a base station, subframe information;
    setting and implementing, by a relay, a service based on the subframe information;
    transmitting, by the relay, interval information of the service to the base station;
    modifying, by the base station, the subframe information based on the interval information; and
    transmitting, by the base station, the modified subframe information to the relay.

12. The method of claim 11, wherein the transmitting of the interval information comprises transmitting, to the base station, the interval information and an initiation time of the service.

13. The method of claim 12, wherein the subframe information is associated with a number of subframes and information associated with a location of each subframe.

14. The method of claim 13, wherein the modifying of the subframe information comprises:
    calculating a retransmission frame where a transmission of information fails and thereby the information is retransmitted, based on the interval information and the initiation time; and
    modifying the subframe information so as not to overlap the location of each subframe and the retransmission frame.

15. The method of claim 11, further comprising:
    modifying, by the relay receiving the modified subframe information, the interval information based on the modified subframe information.

16. The method of claim 15, further comprising:
    transmitting, by the relay to the base station, the modified interval information and a time when the interval information is modified.

17. The method of claim 16, wherein the setting and the transmitting comprises transmitting the subframe information to the relay by broadcasting the subframe information as system information.

18. The method of claim 11, wherein the transmitting of the interval information comprises transmitting the interval information using a signal message of an RRC layer.

19. The method of claim 11, wherein the transmitting of the interval information comprises transmitting the interval information using a MAC PDU.

20. The method of claim 19, wherein the transmitting of the interval information comprises transmitting the interval information by adding a control element to the MAC PDU.

* * * * *